United States Patent [19]

Tomisawa

[11] Patent Number: 4,682,317

[45] Date of Patent: Jul. 21, 1987

[54] SUBCODE SIGNAL READING CIRCUIT IN AN OPTICAL TYPE DISC PLAYER

[75] Inventor: Norio Tomisawa, Hamamatsu, Japan

[73] Assignee: Nippon Gakki Seizo Kabushiki Kaisha, Hamamatsu, Japan

[21] Appl. No.: 660,435

[22] Filed: Oct. 11, 1984

[30] Foreign Application Priority Data

Oct. 14, 1983 [JP] Japan ................................ 58-190912

[51] Int. Cl.$^4$ .............................................. G11B 7/00
[52] U.S. Cl. ..................................................... 369/59
[58] Field of Search ...................... 369/59, 111, 48, 49, 369/30, 32; 360/38.1; 358/336; 371/31

[56] References Cited

U.S. PATENT DOCUMENTS 4,328,580  5/1982  Stockham, Jr. et al. ............. 369/59
4,495,474  1/1985  Nishikawa et al. ................... 369/59
4,541,093  9/1985  Furuya et al. ......................... 369/59

Primary Examiner—Donald McElheny, Jr.
Attorney, Agent, or Firm—Spensley Horn Jubas & Lubitz

[57] ABSTRACT

A subcode signal reading circuit in a compact disc player of the compact disc digital audio system comprises an EFM demodulation circuit which receives an EFM reproduction signal reproduced from a disc, EFM-demodulates the EFM reproduction signal and outputs a demodulated eight-bit signal, a first register in which a Q subcode included in the demodulated eight-bit signal provided by the EFM demodulation circuit is written in eight-bit fashion, a second register to which contents of the first register are transmitted and an error detection circuit for detecting whether or not the Q subcode produced by the EFM demodulation circuit contains error. Transmission of the contents of the first register to the second register is controlled by an output of the error detection circuit in such a manner that the transmission is made when no error has been detected by the error detection circuit. An output of the second register is used in the disc player as a correct Q subcode to be read.

5 Claims, 9 Drawing Figures

PRIOR ART FIG. 1

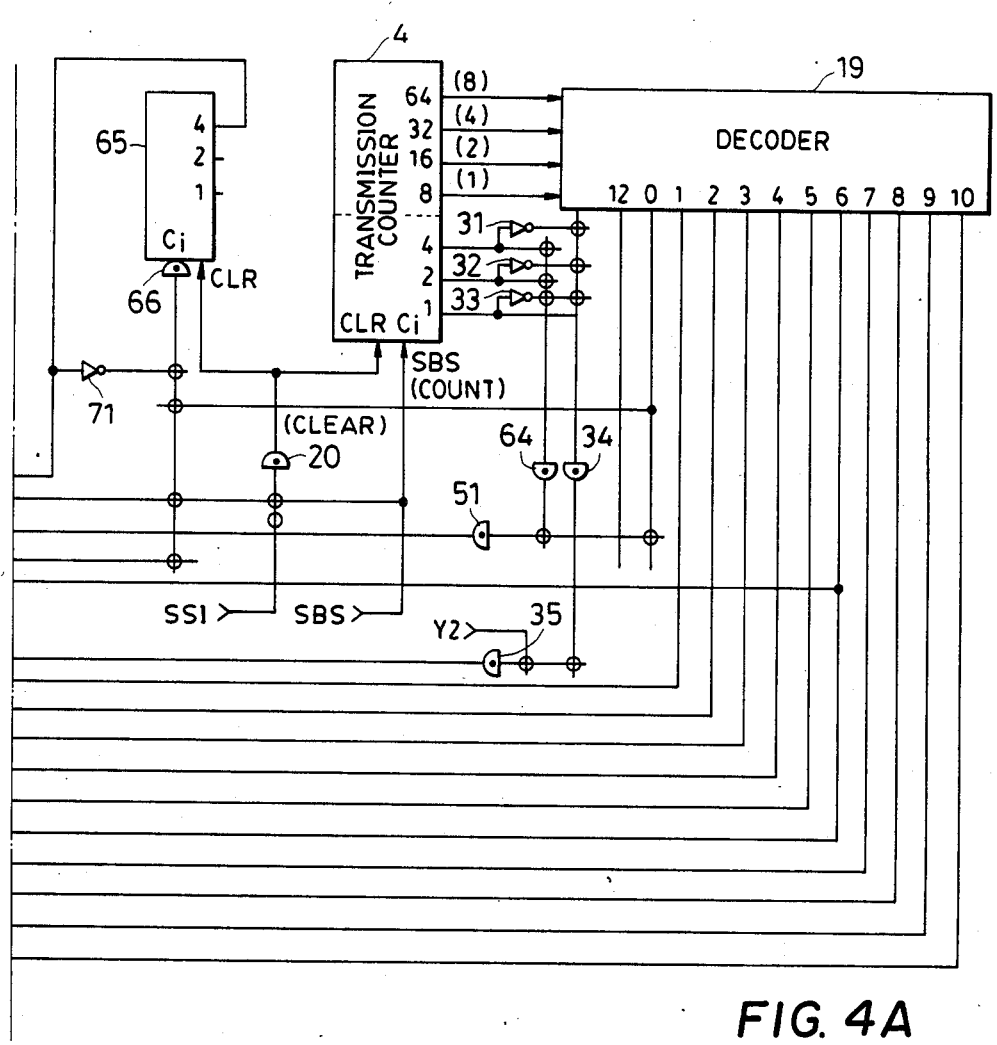
FIG. 4A
FIG. 4
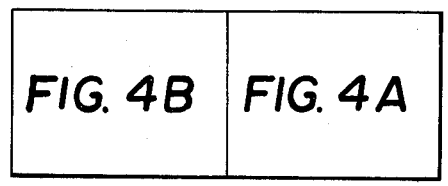

SUBCODE SIGNAL READING CIRCUIT IN AN OPTICAL TYPE DISC PLAYER

FIELD OF THE INVENTION

The invention relates to a circuit in a compact disc player for reading the Q subcode in the compact disc digital audio system:

BACKGROUND OF THE INVENTION

As shown in FIG. 1(a), the data format of a compact disc of the compact disc digital audio system is such that one data frame consists of 588 channel-bits including a one-symbol (eight bits) subcode area. The subcode, completed using 98 data frames, is constituted of eight 98-bit channels P, Q, ..., W, as shown in FIG. 1(b). The subcode in the channel Q (Q subcode) consists of 98 bits or 2-bit synchronizing signal $S_0$, $S_1$, a 4-bit control signal, a 4-bit address signal, a 72-bit data signal, and 16-bit parity check signal, as shown in FIG. 1(c). The data signal has three modes 1, 2 and 3. The mode is determined by the preceding 4-bit address signal as shown in Table 1.

TABLE 1

| mode   | address signal |
|--------|----------------|
| mode 1 | 0001           |
| mode 2 | 0010           |
| mode 3 | 0011           |

The Q subcode in the mode 1 is time data in which are recorded the time which has elapsed from the beginning of playing of a certain music piece in the disc (referred to as "piece time" below) and the time which has elapsed from the beginning of playing of the first piece in the disc (referred to as "accumulated time" below). This time data is represented in the BCD code in respect of minutes, seconds and frames, two digits and eight bits each. There is provided an 8-bit blank between said piece time data and the accumulated time data. This piece time data is preceded by 8-bit data showing the number of pieces in the disc and 8-bit index data. The Q subcode in the mode 2 and mode 3 provides data on the catalogue number, maker number, country number, and the like.

SUMMARY OF THE INVENTION

An object of the invention is to provide a circuit to read the Q subcode signal, whereby error in the Q subcode read from the disc is detected to perform effective signal processings so as to obtain only the correct Q subcode.

According to the invention, the Q subcode read from the disc is divided into 8-bit data and stored in a first register while the Q subcode is checked for errors and, only in the event no error is found, each divided data of the Q subcode held in the first register is transmitted to a second register. The data transmitted to the second register is used as proper or correct Q subcode to indicate time, etc. This enables an effective signal processing of the Q subcode. Also, when the Q subcode is in the mode 1, the P subcode data may be inserted in the blank provided in the Q subcode.

According to the invention, there is provided a subcode signal reading circuit in an optical type disc reproduction device comprising: an EFM demodulation circuit receiving an EFM reproduction signal reproduced from an optical disc, EFM-demodulating the EFM reproduction signal and outputting a demodulated eight-bit signal; a first register in which one of Q subcode signal included in the demodulated eight-bit signal provided by said EFM demodulation circuit is written in 8-bit divided fashion; a second register to which contents of said first register are transmitted; and an error detection circuit for detecting whether or not the Q subcode produced by said EFM demodulation circuit contains error, transmission of the contents of said first register to said second register being controlled by an output of said error detection circuit, the transmission being made when no error has been detected by said error detection circuit, and an output of said second register being used in said optical type disc reproduction device as a correct Q subcode to be read.

BRIEF DESCRIPTION OF THE DRAWINGS

FIG. 4 which comprises FIGS. 4A and 4B show a specific example of the circuit illustrated in FIG. 3.

DESCRIPTION OF A PREFERRED EMBODIMENT

An embodiment of the invention will be described below with reference to the attached drawings.

Figure 1:
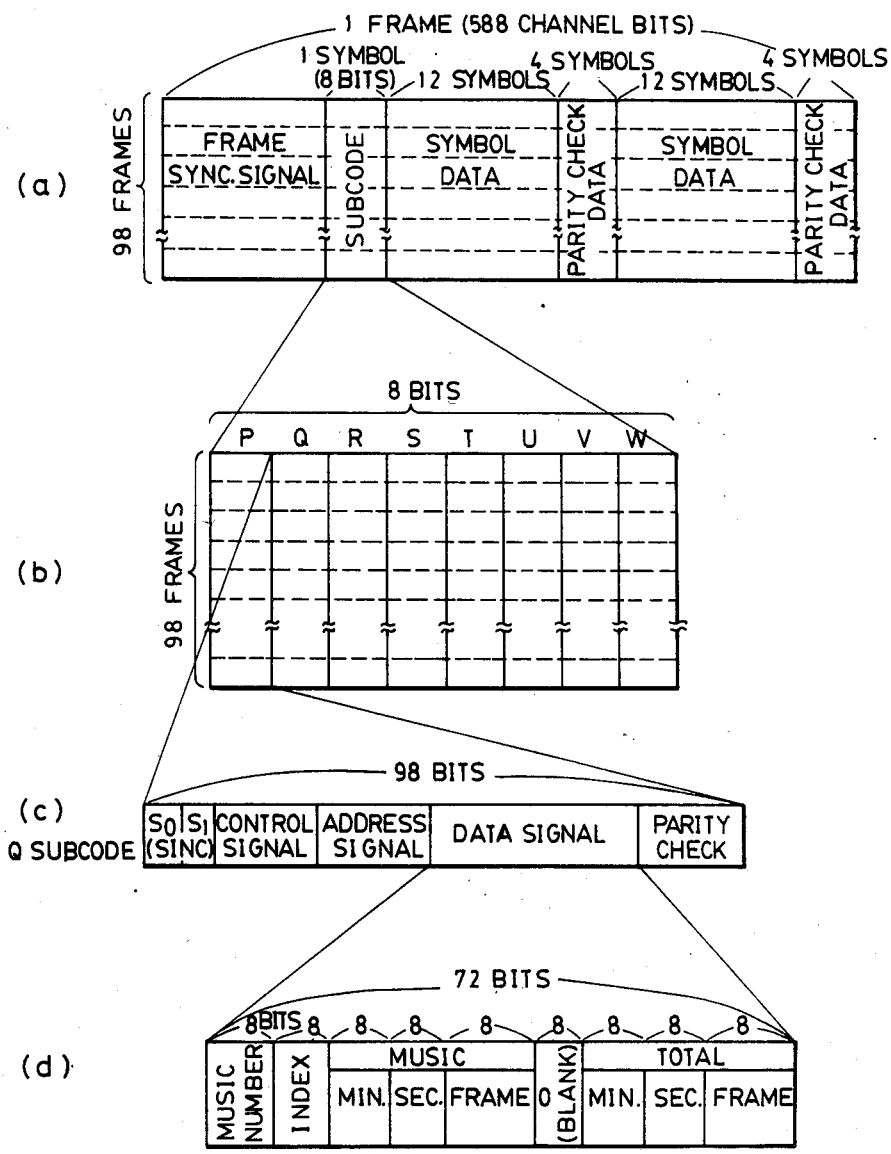
FIG. 1, consisting of (a)-d, shows the data format of the compact disc.
Figure 2:
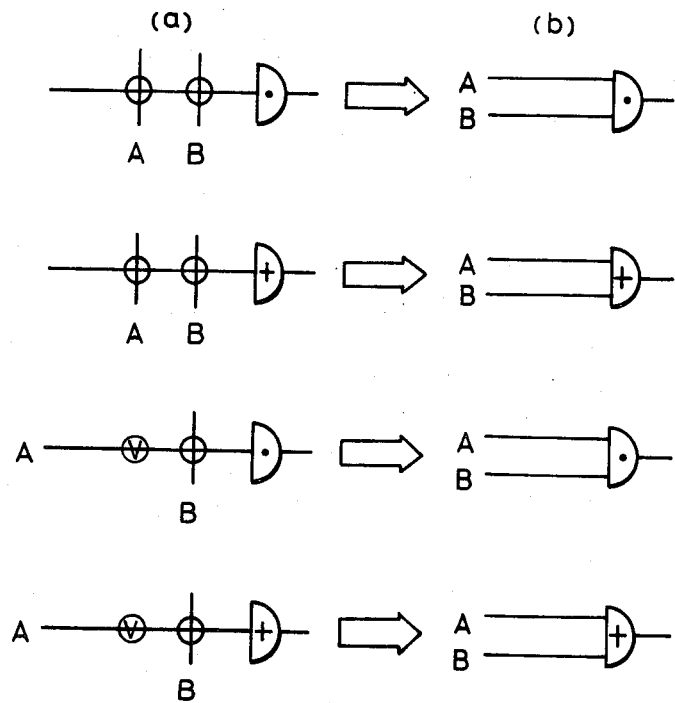
FIG. 2, consisting of (a) and (b), shows how the logical circuits are indicated in the drawings in the present application.

For clarity, the logical circuits are indicated in a simplified manner in the drawings. FIG. 2(a) shows examples of simplified signs to designate the logical circuits corresponding respectively to the generally used signs shown in FIG. 2(b).

Figure 3:
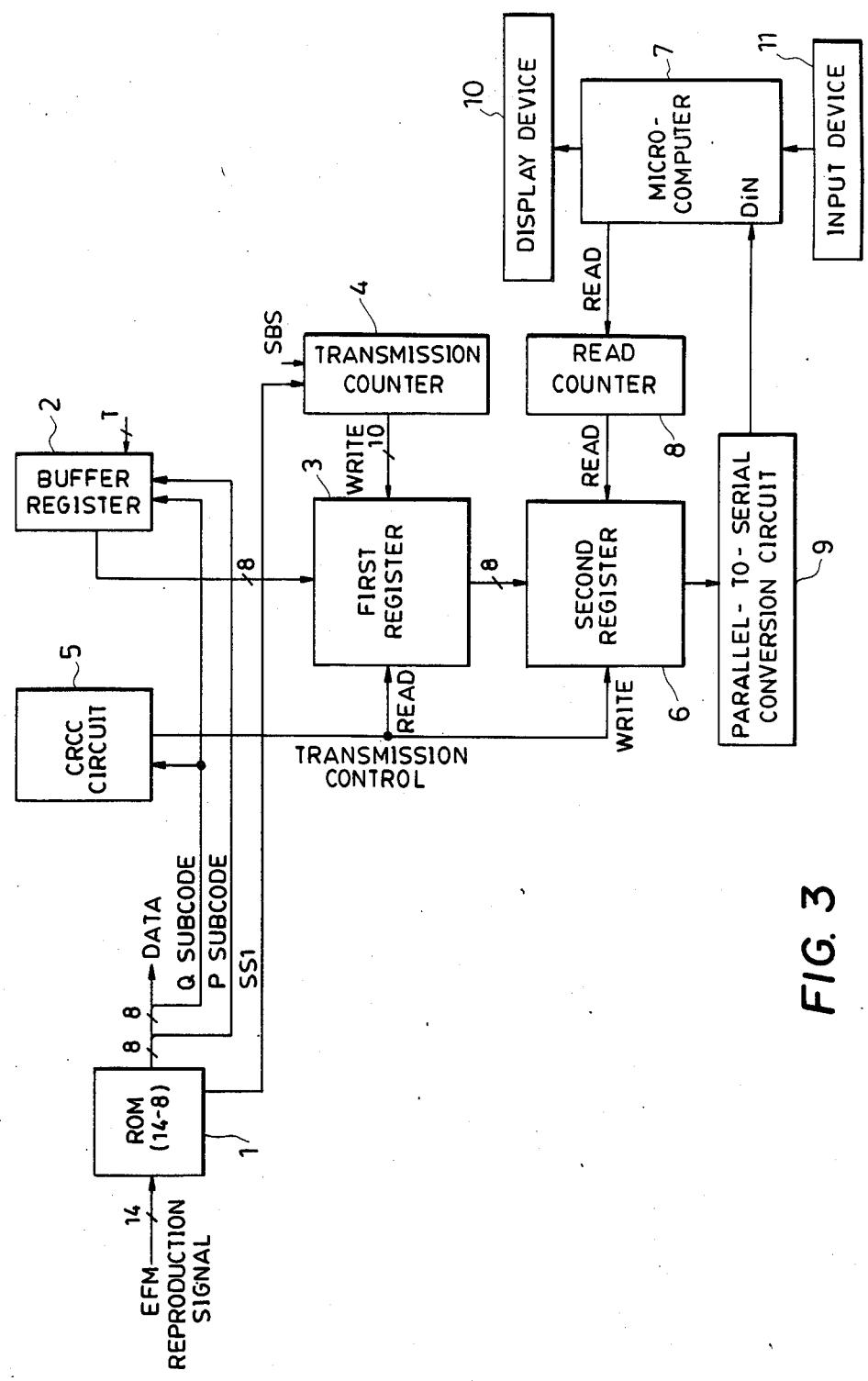
FIG. 3 is a block diagram showing an embodiment of the invention.

According to the embodiment shown in FIG. 3 of a subcode signal reading circuit in a compact disc player of the compact disc digital audio system, in the mode 1, the P subcode representing a head position of a music piece is inserted in the 8-bit blank in the Q subcode between the piece time data and the accumulated time data so that the P subcode may be transmitted together with the Q subcode. In FIG. 3, the EFM reproduction signal obtained from the disc is EFM-demodulated by ROM 1- . Among the data produced from ROM1- , the Q subcode signal and the P subcode signal, one channel-bit of which signals is contained in each frame consisting of 588 channel-bits, are sequentially applied to a buffer register 2. The part of the Q subcode preceded by the synchronizing signal $S_0$, $S_1$ is divided into 8-bit data (referred to as "divided Q subcode data" below) so as to be latched in the 8-bit buffer register 2 and produced as parallel data. The Q subcode in the mode 1 is divided into ten data as shown in Table 2. The first control signal and address signal, each composed of four bits, make one (1) divided Q subcode data. Each of the other signals, composed of eight bits, is treated as one (1) divided Q subcode data.

TABLE 2

| | DIVIDED Q SUBCODE DATA | |
|---|---|---|
| output order | | bit<br>1 2 3 4 5 6 7 8 |
| 1 | control signal | address signal |
| 2 | piece number | |
| 3 | index | |
| 4 | piece time (min.) | |

TABLE 2-continued

| | DIVIDED Q SUBCODE DATA | |
|---|---|---|
| output order | | bit<br>1 2 3 4 5 6 7 8 |
| 5 | piece time (sec.) | |
| 6 | piece time (frame) | |
| 7 | blank | |
| 8 | accumulated time (min.) | |
| 9 | accumulated time (sec.) | |
| 10 | accumulated time (frame) | |

When the Q subcode is in the mode 1, the P subcode is inserted in the Q subcode such that the P subcode is taken in the buffer register 2 at the 8-bit blank in the Q subcode between the piece time data and the accumulated time data. The divided Q subcode data produced from the buffer register 2 is applied to a first register 3. The first register 3 comprising ten 8-bit addresses writes the ten sequentially applied divided Q subcode data into the respective addresses specified by a transmission counter 4.

The transmission counter 4 counts one up every data frame as it counts a Q subcode synchronizing signal SBS (a signal indicating the output timing of the Q subcode signal of which one channel-bit is contained in one 588-channel-bit data frame) until the count reaches 98, when the transmission counter 4 is reset by a subcode synchronizing pattern detection signal SS1 (a signal which is produced once at the end of 98 data frames in accordance with the pattern of the 98-data-frame subcode synchronizing signal $S_0$, $S_1$)

Every eight counts, i.e., every time one complete divided Q subcode data is provided in the buffer register 2, the transmission counter 4 produces a signal specifying the address for the data to be written into so that the output data of the buffer register 2 may be written into the corresponding addresses in the first register 3. Storage of all the divided Q subcode data contained in one (1) Q subcode in the first register 3 is completed by carrying out such writing ten times.

A CRCC (cyclic redundancy check code) circuit 5 detects errors, if any, in the Q subcode. In the event no errors are found, the CRCC circuit 5 reads out the ten data stored in the first register 3 and transmits and writes the data into a second register 6. The second register 6 comprises ten 8-bit addresses as does the first register 3. In the event errors are detected in the Q subcode by the CRCC circuit 5, the content of the first register 3 is not transmitted to the second register 6 and instead the previous data remains held in the second register 6.

The data held in the second register 6 is sequentially read in response to the instruction from a microcomputer 7 according to the address command which is the count given by a read counter 8, and converted into serial data by a parallel-to-serial conversion circuit 9 so as to be used to indicate the piece or accumulated time in a display device 10 or retrieve the piece number designated by an input device 11.

Figure 4B:
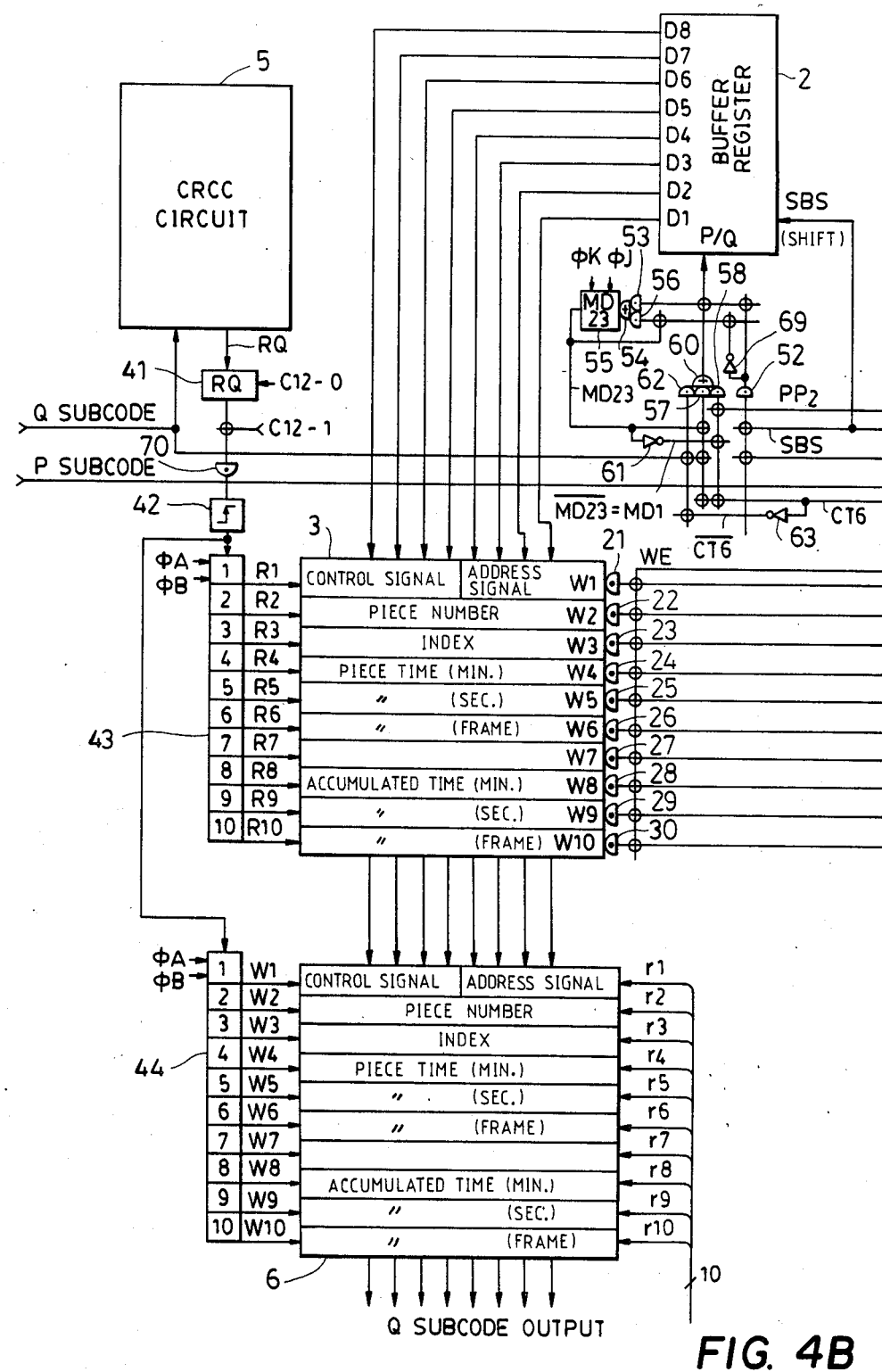

FIG. 4 illustrates a specific example of the circuit shown in FIG. 3. In FIG. 4, the buffer register 2 consisting of an 8-bit shift register is supplied through an AND gate 57 or 62 with the Q subcode signal of which one channel-bit is contained in every data frame of the EFM reproduction signal. The buffer register 2 sequentially shifts the supplied Q subcode signal in response to the Q subcode synchronizing signal SBS produced at the Q subcode output timing in one data frame. Storage of one divided Q subcode data is completed by eight shiftings. As will be described later, the AND gate 57 produces the seventh divided Q subcode data (data corresponding in position to the blank in the mode 1) in the mode 2 or 3 while in every mode the AND gate 62 produces the nine divided Q subcode data except the seventh.

The divided Q subcode data stored in the buffer register 2 is transmitted as parallel data to the first register 3 and stored in the designated addresses.

The transmission counter 4 consisting of a 7-bit binary counter counts one up at the Q subcode output timing in every data frame in response to the Q subcode synchronizing signal SBS until the count reaches 98, when the transmission counter 4 is cleared in response to the output from an AND gate 20 being the logical product of the subcode synchronizing pattern detection signal SS1 and the Q subcode synchronizing signal SBS.

A decoder 19 decodes the fourth to seventh bit outputs of the transmission counter 4. The fourth bit output of the transmission counter 4 is 8 in decimal and corresponds to the number of data bits constituting one (1) divided Q subcode data. Therefore, the output of the decoder 19 indicates the divided Q subcode data number or position in one (1) Q subcode. The divided Q subcode data sequentially held in the buffer register 2 is written sequentially into the respectively specified addresses of the first register 3 according to the write address command being the output of the decoder 19 which counts up in synchronism with the divided Q subcode data. The writing of all the ten divided Q subcode data contained in one (1) Q subcode is completed through ten writings. AND gates 21 to 30 are provided to apply the outputs of the decoder 19 to the first register 3 at the timing when a write enable signal WE is turned to "1". The write enable signal WE is the signal obtained from an AND gate 35 which is supplied with the output of an AND gate 34 and a signal $Y_2$. The AND gate 34 is provided with the outputs of the least significant three bits of the transmission counter 4 through inverters 31, 32 and 33, respectively so as to produce "1" at the timing when the least significant three bits of the transmission counter 4 are all turned to "0" as a result of carry to the fourth bit or at the timing when the storage of one (1) divided Q subcode data in the buffer register 2 is completed. The signal $Y_2$ is a signal which is turned to "1" at the timing of the channel bit in one 588-channel-bit data frame immediately preceded by the channel bit at which the Q subcode is produced. Accordingly, the write enable signal WE is produced at the timing of the channel bit in one (1) data frame immediately preceded by the channel bit at which the Q subcode signal is produced after one (1) divided Q subcode data has been taken in the buffer register 2, so that the writing into the first register 3 is carried out at said timing.

The CRCC circuit 5 detects errors, if any, in the Q subcode and, when no error is found, produces a signal RQ. The signal RQ is latched in a register 41 in response to a timing signal $C_{12\text{-}0}$ (a signal produced at the timing when the output of the decoder 19 is 12 and the least significant three bits of the transmission counter 4 are 000, i.e., at the timing after a series of Q subcode data is read out). The RQ flag produced from the register 41 is produced through an AND gate 70 at the timing when a timing signal $C_{12\text{-}1}$ (a signal produced at the timing when the output of the decoder 19 is 12 and the least significant three bits of the transmission counter 4 are 001) is produced.

The rise in the output of the AND gate 70 is detected by a rise detection circuit 42 of which the output is applied to shift registers 43 and 44 so as to be shifted sequentially in response to clocks $\phi A$, $\phi B$ (an 18th of one (1) data frame time period 136 $\mu$s). The shift register 43 consists of ten bits of which the respective outputs R1 to R10 are applied as read address signals to the first register 3 to read respective data sequentially. The shift register 44 also consists of ten bits of which the respective outputs W1 to W10 are applied as write address signals to the second register 6 to write the respective data produced from the first register 3 into the corresponding addresses. The data written into the second register 6 is read out sequentially according to read addresses r1 to r10 supplied from the microcomputer 7.

According to the present embodiment, when the Q subcode is in the mode 1, the P subcode is inserted in the Q subcode using the 8-bit blank provided between the piece time data and the accumulated time data in the Q subcode so as to transmit the P subcode together with the Q subcode. The insertion of the P subcode in the Q subcode is realized as follows.

In FIG. 4, an AND gate 52 designates the timing of the third bit of the control signal in the Q subcode indicating the mode. The third bit "0" or "1" of the control signal in the Q subcode indicates whether the Q subcode is in the mode 1 or in the mode 2 or 3. The AND gate 52 is supplied with the output of an AND gate 51 and the Q subcode synchronizing signal SBS. The output of the AND gate 51 indicates the timing at which the output of the decoder 19 is "0", and the least significant three-bit output of the transmission counter 4 is 6 and an AND gate 64 is turned on, i.e., the timing at which the seventh data frame of the eight data frames containing the first divided Q subcode data is read out. The Q subcode synchronizing signal SBS indicates the timing at which the Q subcode is read out in that seventh frame. Accordingly, the AND gate 52 indicates the seventh bit in the first divided Q subcode data, i.e., the timing at which the third bit of the control signal in the Q subcode is read out.

An AND gate 53 is provided with the output of an OR gate 60, i.e., the third bit signal of the control signal in the Q subcode at the one-bit timing at which the AND gate 52 produces "1". Therefore, the AND gate 53 produces "0" in the mode 1 and "1" in the mode 2 or 3.

The output of the AND gate 53 is applied through an OR gate 54 to a register 55 and latched according to clocks $\phi J$, $\phi K$ (a 588th of one data frame period) and self-held through an AND gate 56. An inverter 69 is provided to clear the self-holding.

An AND gate 62 is provided through an inverter 63 with a timing signal being the inverse CT6 of a signal CT6 (a signal which is turned to "1" at the timing when the output of the decoder 19 becomes 6, i.e., the timing when the seventh divided Q subcode data is produced) and produces and applies to the buffer register 2 the nine divided Q subcode data except the seventh irrespective of the mode.

The AND gate 57 is provided with the output MD23 of the register 55 and the signal CT6 as timing signals and produces and applies to the buffer register 2 the seventh divided Q subcode data in the mode 2 or 3. Thus, in the mode 2 or 3, the Q subcode is produced without the P subcode being inserted therein.

An AND gate 58 is provided with a signal MD1 indicating the mode 1 from an inverter 61 and the signal CT6 as timing signals and, in the mode 1, produces a P subcode distinguishing signal PP, which is produced from a counter 65, at the timing when the seventh divided Q subcode data (blank) is read out, so that the P subcode is inserted in the blank of the Q subcode in the mode 1 produced from the AND gate 62. The counter 65 distinguishes between the "1" and "0" states of the P subcode by majority. More specifically, the P subcode, a signal for locating the beginning of each piece recorded on the disc, remains "1" at least two seconds at the beginning of a piece and "0" in the other part. However, the P subcode can be partly "0" when it should continuously be "1" or it can be partly "1" when it should continuously be "0". Therefore, the counter 65 counts the number of the bits in the "1" state of the eight bits constituting the P subcode and, when the count is 4 or more, it judges that the optical head is at the beginning of a piece and, when the count is less than 4, it judges that the head is in a position other than the beginning of a piece. That is, the counter 65 enables an AND gate 66 during the eight frames in which the output of the decoder 19 is "0" and, in the meantime, receives eight P subcode signals of which one channel bit is contained in one frame. When the P subcode contains four or more "1"s, the counter 65 self-holds the P subcode through an inverter 71 and applies the output "1" corresponding to the count 4 to the AND gate 58 as the P subcode distinguishing signal PP so as to insert "1" as the P subcode into all the eight bits of the blank in the Q subcode. When the P subcode contains less than four "1"s, the counter 65 applies the output "0" corresponding to the count 4 to the AND gate 58 as the P subcode distinguishing signal PP so as to insert "0" as the P subcode into all the eight bits of the blank in the Q subcode. The counter 65 is reset by the AND gate 20 every 98 data frames.

What is claimed is:

1. A subcode signal reading circuit in an optical type digital audio compact disc reproduction device for processing P subcode and Q subcode data read from a compact disc by the reproduction device comprising:

an eight to fourteen modulation (EFM) demodulation circuit for receiving an EFM reproduction signal reproduced from the optical type compact disc, EFM-demodulating the EFM reproduction signal and outputting a demodulated data signal in eight-bit increments;

a first register in which one of the Q subcode signal included in the demodulated eight-bit signal provided by said EFM demodulation circuit is written in 8-bit divided fashion;

a second register to which contents of said first register are transmitted; and an error detection circuit for detecting whether or not the Q subcode produced by said EFM demodulation circuit contains error, transmission of the contents of said first register to said second register being controlled by an output of said error detection circuit, the transmission being made when no error has been detected by said error detection circuit, and an output of said second register being used in said optical type disc reproduction device as a correct Q subcode to be read.

2. A subcode signal reading circuit as defined in claim 1 further comprising a buffer register that receives the Q subcode and P subcode data of the compact disc and writes the Q subcode signal provided by said EFM demodulation circuit in said first register in eight-bit signals.

3. A subcode signal reading circuit as defined in claim 2 wherein the error detection circuit detects errors in the Q subcode data and generates a control signal in the case of no errors, said control signal indicating the transmission of the contents of said first register to said second register by reading of the contents of said first register and writing of such contents into said second register and wherein the reading and the writing for this transmission are effected by the control signal.

4. A subcode signal reading circuit as defined in claim 3 wherein the Q subcode data processed in said first and second registers has ten Q subcode portions among which the first portion consists of control data and address data, each composed of four bits, and the remaining nine portions, each composed of eight bits, consist of the second portion representing music piece number, the third portion representing index number, the fourth through sixth portions representing music piece time, the seventh portion representing blank, and the eighth through tenth portions representing accumulated time.

5. A subcode signal reading circuit as defined in claim 4 wherein the P subcode representing a beginning portion of a music piece is inserted in the seventh portion representing blank in the Q subcode data signal.

* * * * *